US012160036B1

(12) United States Patent
Strange et al.

(10) Patent No.: US 12,160,036 B1
(45) Date of Patent: Dec. 3, 2024

(54) ANTENNA CONCEALMENT HOUSING

(71) Applicant: Allfasteners USA, LLC, Medina, OH (US)

(72) Inventors: Michael Strange, Columbia Station, OH (US); Bruce A. Carmichael, Hinckley, OH (US); John Mark Wootten, North Olmsted, OH (US)

(73) Assignee: Allfasteners USA, LLC, Medina, OH (US)

( * ) Notice: Subject to any disclaimer, the term of this patent is extended or adjusted under 35 U.S.C. 154(b) by 95 days.

(21) Appl. No.: 17/699,823

(22) Filed: Mar. 21, 2022

Related U.S. Application Data

(60) Provisional application No. 63/163,239, filed on Mar. 19, 2021.

(51) Int. Cl.
*H01Q 1/42* (2006.01)

(52) U.S. Cl.
CPC .................................. *H01Q 1/428* (2013.01)

(58) Field of Classification Search
CPC .................................. H01Q 1/42; H01Q 1/44
See application file for complete search history.

(56) References Cited

U.S. PATENT DOCUMENTS 6,982,680 B2 * 1/2006 Janoschka ............ H01Q 1/1242 343/878
8,077,113 B2 12/2011 Syed et al.
8,593,370 B2 11/2013 Caldwell et al.
9,634,386 B2 4/2017 Dundorf et al.
9,742,886 B2 8/2017 Hansen et al.
10,199,712 B1 2/2019 Boyle et al.
10,347,979 B1 * 7/2019 Boyle .................. H01Q 1/1228
11,406,033 B2 * 8/2022 Griffin ................. H05K 5/0221
2015/0045093 A1 * 2/2015 Hansen, Sr. ............. H01Q 1/44 455/561
2015/0070230 A1 3/2015 Bradley et al.
2016/0211574 A1 * 7/2016 Dundorf .................. H01Q 1/44
2019/0140347 A1 5/2019 Bouchard
2019/0221913 A1 * 7/2019 Castronova .............. H01Q 1/44

* cited by examiner

*Primary Examiner* — Shawn M Braden
(74) *Attorney, Agent, or Firm* — Luedeka Neely, P.C.

(57) ABSTRACT

A radome system includes an access panel having an upper end including an upper latch and a lower end including a lower latch. The radome system further includes a frame system including a first mounting frame positioned adjacent the upper end of the access panel and a second mounting frame positioned adjacent the lower end of the access panel. The upper end of the access panel is hindgedly connected to the first mounting frame and the lower end of the access panel is hingedly connected to the second mounting frame for hingedly connecting the access panel to the frame system. The first mounting frame includes an upper latch receiver for removably securing the upper end of the access panel to the first mounting frame, and the second mounting frame includes a lower latch receiver for removably securing the lower end of the access panel to the second mounting frame.

20 Claims, 5 Drawing Sheets

ANTENNA CONCEALMENT HOUSING

CROSS REFERENCE TO RELATED APPLICATION

This application claims priority to U.S. Provisional Application Ser. No. 63/163,239 filed Mar. 19, 2021, entitled "Antenna Concealment Housing," the entire contents of which is incorporated herein by reference.

FIELD

The present disclosure is directed to an antenna concealment housing. More specifically, the present disclosure is directed to a hinged door assembly for an antenna concealment housing.

BACKGROUND

A cell site is a site where antennas and electronic communications equipment are placed. Often, cell sites are positioned on raised structures referred to as cell towers. The communications equipment is covered by a radome (or otherwise described as a shroud) that protects and conceals the electronic communications equipment housed within the radome.

Current radome designs for cell towers include access panels that are formed of radio-frequency transparent materials. The access panels are designed to protect/conceal the electronic communications equipment within the radome when the panels are in a closed position. The access panels also provide an open position for permitting access to the communications equipment within the radome when desired by a technician (e.g., for servicing and maintenance of the communications equipment). However, the access panels of existing radome designs have several flaws. For example, many current designs include extensive hardware (e.g., bolts and fasteners) used to secure the panels in the closed position. Removing and replacing the hardware and otherwise handling the panels at the heights of the cell towers has proved to be a cumbersome and slow process. Similarly, the necessary hardware for securing the concealment panels in place is often found to be missing or damaged, which leaves the panels susceptible to blowing open or even falling off the cell tower in a windstorm. Further, even when the panels are able to be successfully moved to an open position, the panels still obstruct the technician and provide limited access to the inside of the radome.

What is needed therefore is a radome design that provides an easy opening system for the concealment panels while simultaneously providing enhanced accessibility to the inside of the radome when the panels are in the open position.

SUMMARY

The above and other needs are met by a radome system including an access panel and a frame system. The access panel includes an upper end and a lower end, the upper end including an upper latch and the lower end including a lower latch. The frame system includes a first mounting frame positioned adjacent the upper end of the access panel and a second mounting frame positioned adjacent the lower end of the access panel, the upper end of the access panel being hindgedly connected to the first mounting frame and the lower end of the access panel being hingedly connected to the second mounting frame for hingedly connecting the access panel to the frame system. The first mounting frame includes an upper latch receiver for removably securing the upper end of the access panel to the first mounting frame when the upper latch engages the upper latch receiver, and the second mounting frame includes a lower latch receiver for removably securing the lower end of the access panel to the second mounting frame when the lower latch engages the lower latch receiver.

According to certain embodiments, the radome system further includes an upper cover panel configured to be removably secured to the first mounting frame and a lower cover panel configured to be removably secured to the second mounting frame. The upper cover panel is dimensioned and configured for covering the upper latch of the access panel and the upper latch receiver of the first mounting frame when the access panel is in a closed position and the upper cover panel is removably secured to the first mounting frame. The lower cover panel is dimensioned and configured for covering the lower latch of the access panel and the lower latch receiver of the second mounting frame when the access panel is in the closed position and the lower cover panel is removably secured to the second mounting frame.

According to certain embodiments, the upper latch and the lower latch each include a hook for engaging the corresponding latch receiver, the upper latch and the lower latch being operable to be manipulated from a first position in which the hook fully engages the latch receiver to a second position in which the hook is disengaged from the latch receiver. According to this embodiment, the upper latch and the lower latch are sized dimensioned such that the upper cover panel and the lower cover panel cannot be secured to the corresponding first and second mounting frames when the upper and lower latch are not in the first position.

According to certain embodiments, each of the first mounting frame and the second mounting frame include a sidewall portion for securing the first and second mounting frames to a support structure of a monopole and a flange portion extending radially from the sidewall portion, the flange portion of the first mounting frame including the upper latch receiver and the flange portion of the second mounting frame including the lower latch receiver. In some embodiments, the upper latch receiver includes an upper vertical post member extending downward along a length of the sidewall portion of the first mounting frame and spaced apart from the sidewall portion of the first mounting frame, and the lower latch receiver includes a lower vertical post member extending upward along a length of the sidewall portion of the second mounting frame and spaced apart from the sidewall portion of the second mounting frame. The hook of the upper and lower latch is configured to engage the upper and lower vertical post member of the corresponding upper and lower latch receiver at different positions along the vertical post member based on a vertical positioning of the access panel with respect to the first and second mounting frames.

According to certain embodiments, at least one of the first mounting frame and the second mounting frame include a hinge assembly having a hinge pin for rotatably engaging a hinge frame portion of the access panel and one or more removable spacer portions configured to adjust a height in which the hinge pin engages the hinge frame portion such that the vertical positioning of the access panel with respect to the first and second mounting frames is adjustable. In some embodiments, the hinge assembly includes a fixed spacer portion secured to one of the first mounting frame and the second mounting frame and a collar, the hinge pin is configured to extend from the fixed spacer portion with the one or more removable spacer portions positioned around the hinge pin between the fixed spacer portion and the collar. In some embodiments, each of the first mounting frame and the second mounting frame include a sidewall portion for securing the first and second mounting frames to a support structure of a monopole and a flange portion extending radially from the sidewall portion, the flange portion of one of the first mounting frame and the second mounting frame including the fixed spacer portion.

According to certain embodiments, the radome system further includes a latch bar secured to the second mounting frame, the latch bar including a distal end for engaging the lower end of the access panel to hold the access panel in an open position.

According to certain embodiments, the radome system further includes a plurality of access panels each having an upper end hingedly connected to the first mounting frame and a lower end hingedly connected to the second mounting frame.

According to another embodiment of the disclosure, a radome system includes an access panel and a frame system. The access panel includes an upper end and a lower end. The frame system includes a first mounting frame positioned adjacent the upper end of the access panel and a second mounting frame positioned adjacent the lower end of the access panel, the upper end of the access panel being hindgedly connected to the first mounting frame and the lower end of the access panel being hingedly connected to the second mounting frame. At least one of the first mounting frame and the second mounting frame include a hinge assembly having a hinge pin for rotatably engaging a hinge frame portion of the access panel and one or more removable spacer portions configured to adjust a height in which the hinge pin engages the hinge frame portion such that a vertical positioning of the access panel with respect to the frame system is adjustable.

According to certain embodiments, the hinge assembly includes a fixed spacer portion secured to one of the first mounting frame and the second mounting frame and a collar, the hinge pin configured to extend from the fixed spacer portion with the one or more removable spacer portions configured to be selectively positioned around the hinge pin between the fixed spacer portion and the collar. In some embodiments, each of the first mounting frame and the second mounting frame include a sidewall portion for securing the first and second mounting frames to a support structure of a monopole and a flange portion extending radially from the sidewall portion, the flange portion of one of the first mounting frame and the second mounting frame including the fixed spacer portion. In some embodiments, the hinge pin is secured to the fixed spacer portion. In other embodiments, the fixed spacer portion is configured to receive the hinge pin.

According to certain embodiments, both the first mounting frame and the second mounting frame include the hinge assembly.

According to certain embodiments, the one or more removable spacer portions includes a plurality of removable spacer portions for selectively being used with the hinge assembly. In some embodiments, the plurality of removable spacer portions each include a different length.

According to certain embodiments, the radome system further includes a plurality of access panels each having an upper end hingedly connected to the first mounting frame and a lower end hingedly connected to the second mounting frame, and wherein at least one of the first mounting frame and the second mounting frame include a plurality of hinge assemblies corresponding to the plurality of access panels, each of the plurality of access panels including at least one of the hinge assemblies.

BRIEF DESCRIPTION OF THE DRAWINGS

Other embodiments of the invention will become apparent by reference to the detailed description in conjunction with the figures, wherein elements are not to scale so as to more clearly show the details, and wherein like reference numbers indicate like elements throughout the several views, and wherein.

DETAILED DESCRIPTION

The following description of preferred embodiments for this disclosure is presented for purposes of illustration and description. It is not intended to be exhaustive or to limit the disclosure to the precise form disclosed. Obvious modifications or variations are possible in light of the following teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the invention as determined by the appended claims when interpreted in accordance with the breadth to which they are fairly, legally, and equitably entitled.

Figure 1:
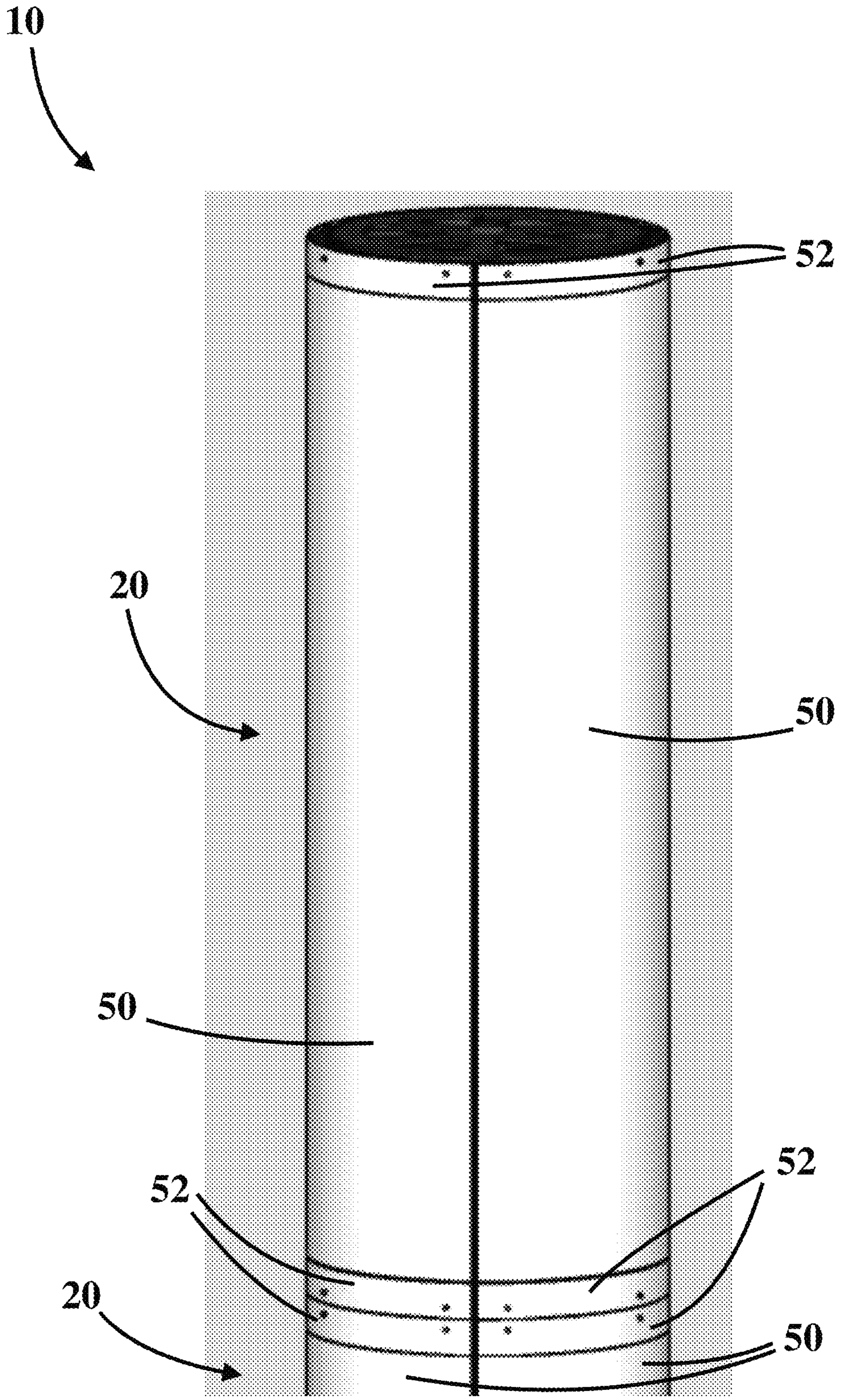
FIG. 1 depicts a radome system with a plurality of stacked access panel sections in a closed position according to one embodiment of the disclosure.
Figure 2:
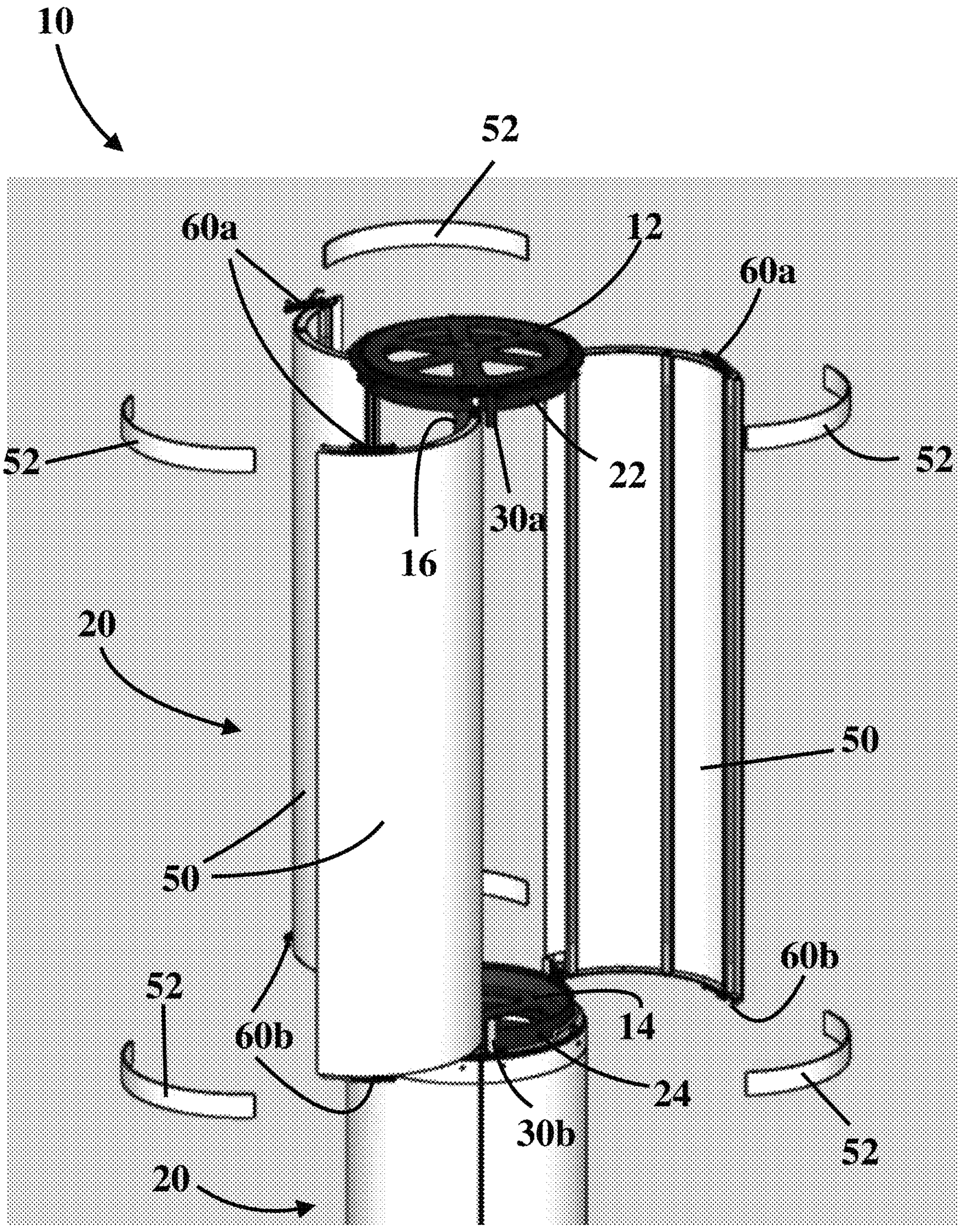
FIG. 2 depicts the radome system of FIG. 1 with the access panels of the upper access panel section in an open position according to one embodiment of the disclosure.

With reference to FIGS. 1-2, a radome system 10 according to one embodiment of the present disclosure is depicted with a plurality of stacked access panel sections 20. Radome system 10 is shown as including three access panels 50 for each panel section 20 but it should be understood that radome system 10 could include any number of panels as desired within the scope of the present disclosure. Panels 50 are depicted in the closed position in FIG. 1 while panels 50 of the upper panel section 20 of FIG. 2 are depicted in the open position. As will be described in more detail below, cover panels 52 are provided to cover the gaps between stacked access panels. In certain embodiments, and as will also be described in more detail below, the cover panels 52 are removable as depicted in FIG. 2 to access latch assemblies for opening each of the access panels 50.

With reference to FIG. 2, each access panel section 20 of radome system 10 is secured to a support structure including a top plate 12, a bottom plate 14, and a central spine 16 extending from the top plate 12 to the bottom plate 14. The support structure is used for mounting electronic communications equipment (not shown) to the radome system 10 as known in the art and for mounting access panels 50 as described herein. In certain embodiments, the support structure is part of an existing monopole in which the radome system 10 is intended to be retrofitted. In other embodiments, the support structure is a new monopole installation in which the radome system 10 is intended to be installed. In the latter embodiment, the support structure may be included (i.e., installed) as part of the radome system 10.

With continued reference to FIG. 2, each access panel section 20 includes a first mounting frame 22 for securing around the top plate 12 and a second mounting frame 24 for securing around the bottom plate 14. In certain embodiments, the first and second mounting frames 22, 24 are formed from multiple frame sections with each frame section of the first and second mounting frames being used to connect one of the access panels 50 to the access panel section 20. As described in further detail below, each access panel 50 is hingedly connected to the first and second mounting frames 22 and 24 such that each of the access panels 50 are operable to move from the closed position as shown in FIG. 1 to the open position as shown in FIG. 2. In certain embodiments, and as also described in further detail below, the positioning of the access panels 50 with respect to the first mounting frame 22 and/or the second mounting frame 24 is able to be vertically adjusted. This vertical flexibility of the access panels 50 allows a technician to better account for inaccurate field measurements and varying dimensions from elevation to elevation of the monopole support structure during installation of the radome system 10. The vertical flexibility also provides for efficient modification of the radome system 10 as needed after initial installation, such as when an obstruction to the tower forces a field change in the mounting location of the electronic communications equipment.

With continued reference to FIG. 2, each access panel 50 includes an upper end having an upper latch 60*a* preferably disposed on a top surface of the access panel 50 and a lower end having a lower latch 60*b* preferably disposed under a bottom surface of the access panel 50. First mounting frame 22 then includes a plurality of latch receivers 30*a* positioned and configured to engage upper latches 60*a* of the access panels 50 while second mounting frame 24 similarly includes a plurality of latch receivers 30*b* positioned and configured to engage lower latches 60*b*. In operation, when the upper latch 60*a* of an access panel 50 engages its corresponding latch receiver 30*a* and the lower latch 60*b* of the same access panel 50 engages its corresponding latch receiver 30*b*, the access panel 50 is in the closed position. In the closed position, a cover panel 52 may be secured (e.g., bolted) to the first mounting frame 22 to cover upper latch 60*a* and latch receiver 30*a* while another cover panel 52 may be secured to second mounting frame 24 to cover lower latch 60*b* and latch receiver 30*b*.

Figure 3:
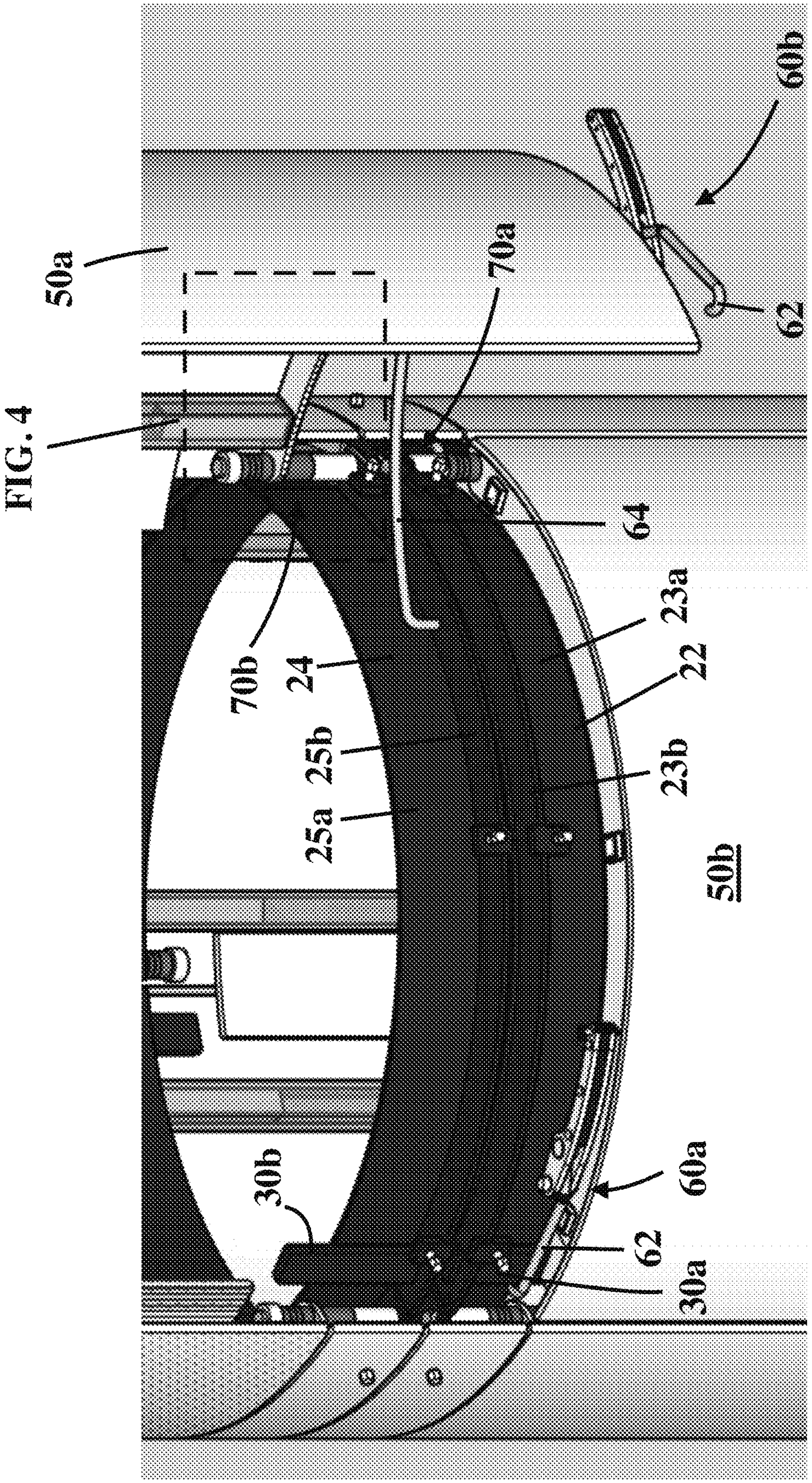
FIG. 3 depicts an enlarged view of a second mounting frame with an access panel of an upper access panel section in the open position and a first mounting frame with an access panel of a lower access panel section in the closed position.

With reference to FIG. 3, a lower portion of a first access panel 50*a* hingedly connected to a corresponding second mounting frame 24 and an upper portion of a second access panel 50*b* hingedly connected to a corresponding first mounting frame 22 are depicted with cover panels 52 between access panel 50*a* and access panel 50*b* removed (and top plate 12, bottom plate 14, and central spine 16 of support structure being omitted). Access panel 50*a* is shown in the open position with its lower latch 60*b* disengaged from its corresponding latch receiver 30*b*. On the other hand, access panel 50*b* is shown in the closed position with its upper latch 60*a* engaging latch receiver 30*a*. As depicted, the first mounting frame 22 preferably includes a sidewall portion 23*a* for securing the first mounting frame 22 (or a first mounting frame section as described above) to a corresponding top plate 12 and a flange portion 23*b* extending radially from the sidewall portion 23*a*. The second mounting frame 24 similarly includes a sidewall portion 25*a* for securing the second mounting frame 24 (or a second mounting frame section) to a corresponding bottom plate 14 and a flange portion 25*b* extending radially from the sidewall portion 25*a*. The latch receivers 30*a* and 30*b* are then positioned on the flange portions 23*b* and 25*b* of their corresponding first mounting frame 22 and second mounting frame 24. As shown, latch receiver 30*a* of mounting frame 22 and latch receiver 30*b* of mounting frame 24 are preferably in the form of a vertical post member that extends from the flange portions 23*b*, 25*b* in the same direction of their corresponding sidewall portions 23*a*, 25*a*. The latch receivers 30*a*, 30*b* are preferably positioned on the flange portions 23*b*, 25*b* such that space is provided between the latch receivers 30*a*, 30*b* and the corresponding sidewall portions 23*a*, 25*a* of the mounting frames 22, 24. A hook 62 of the corresponding upper latch 60*a* and lower latch 60*b* is then able to engage the latch receivers 30*a*, 30*b* when the access panel 50 is in the closed/locked position (panel 50*b* of FIG. 3). The vertical configuration of the latch receivers allows hooks 62 of the latch assemblies to engage the latch receivers at varying heights based on the desired positioning of the access panel with respect to its mounting frames as described below. To unlock the access panel 50 from its corresponding mounting frame, the upper latch 60*a* and lower latch 60*b* are operable to manipulate hook 62 such that it is disengaged from its corresponding latch receiver 30*a*, 30*b* (panel 50*a* of FIG. 3). In preferred embodiments, the upper latch 60*a* and lower latch 60*b* and corresponding latch receivers 30*a*, 30*b* are sized and dimensioned such that cover panels 52 cannot be secured to their mounting frame 22, 24 unless the latch 60*a*, 60*b* is in a fully engaged/locked position with respect to its corresponding latch receiver 30*a*, 30*b*.

According to certain embodiments, latch bars 64 may be secured to the flange portions 23*b* of mounting frame 22 and/or flange portion 25*b* of mounting frame 24 while each access panel 50 includes a corresponding receiver (not shown) in the inside surface of the panel 50 for receiving an end portion of a corresponding latch bar 64. In operation, when the access panel 50 is opened, the end portion of latch bar 64 may inserted into the corresponding receiver of the access panel 50 for assisting in holding the access panel 50 in the open position. In preferred embodiments, at least mounting frame 24 includes latch bars 64 for engaging the lower end of each access panel 50.

Figure 4:
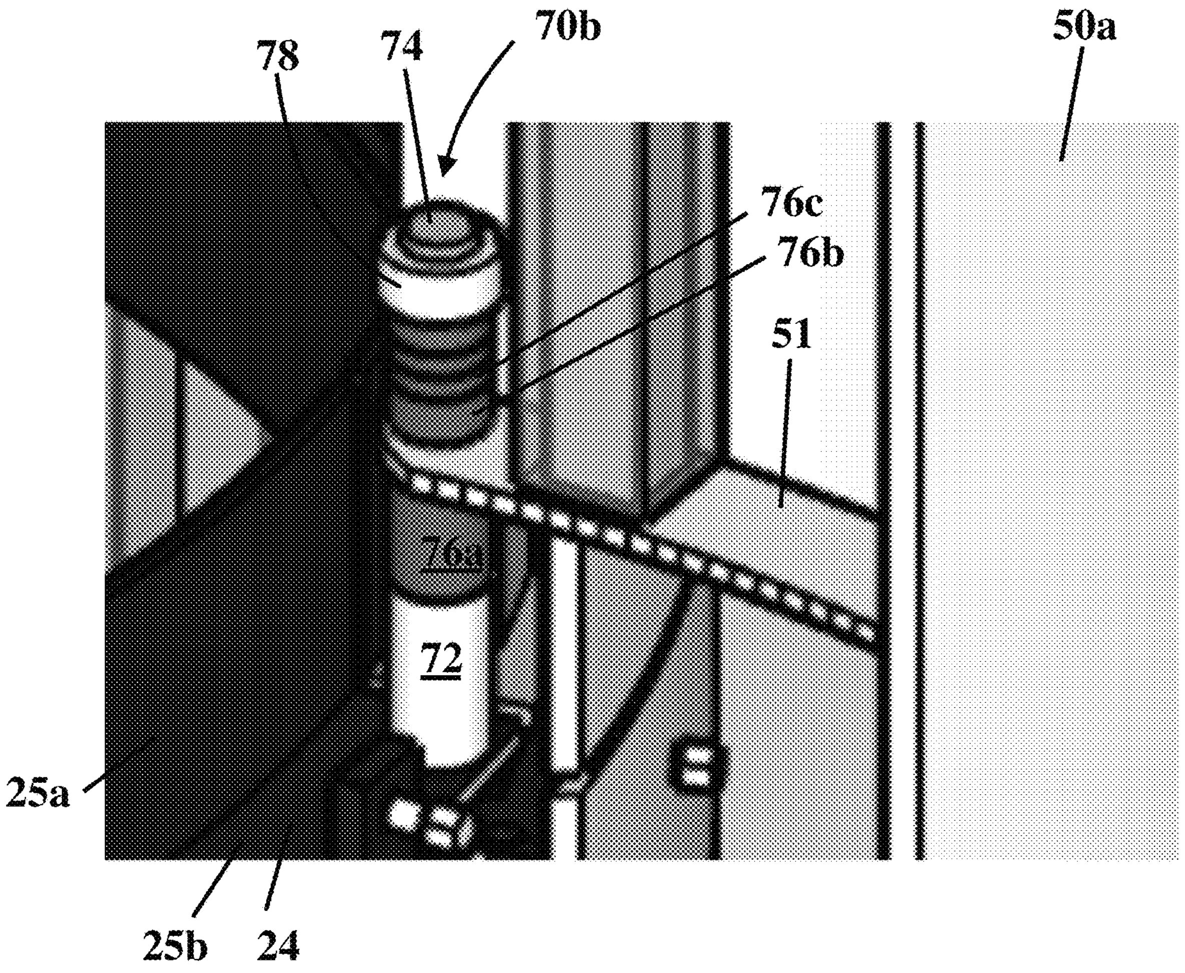
FIG. 4 depicts an enlarged view of the circled hinge assembly of FIG. 3.

With continued reference to FIG. 3, hinge assemblies 70*a* and 70*b* are used to hingedly connect access panels 50 to respective mounting frames 22 and 24. With reference to the enlarged view of FIG. 4 of hinge assembly 70*b*, hinge assembly 70*b* includes a fixed spacer portion 72 secured to the flange portion 25*b* of mounting frame 24, a hinge pin 74 secured to or otherwise operable to be inserted into the fixed spacer portion 72 such that hinge pin 74 is extending therefrom, one or more removable spacer portions 76*a*-76*c* that can be disposed around hinge pin 74, and a collar 78 for securing the removable spacer portions 76*a*-76*c* in the desired position. In operation, the vertical positioning of the access panel 50*a* with respect to the mounting frame 24 may be adjusted by adding, removing, and/or repositioning the fixed spacer portions 76*a*-76*c* from the hinge pin 74. For example, as shown in FIG. 4, one removable spacer portion 76*a* has been placed over the fixed spacer portion 72. A frame portion 51 of the lower end of panel 50*a* is then rotatably secured to the hinge pin 74 above the removable spacer portion 76*a*. Thus, the vertical positioning of access panel 50*a* with respect to mounting frame 24 in FIG. 4 is determined by the length of the fixed spacer portion 72 and the removable spacer portion 76*a*. If a technician wanted to lower the access panel 50*a*, spacer portion 76*a* may be removed and/or repositioned above frame portion 51. On the other hand, if a technician wanted to raise the access panel 50*a*, spacer portions 76*b* and/or 76*c* could be repositioned such that they are directly above spacer portion 76*a* followed by the frame portion 51 of panel 50*a*.

In certain embodiments, the second mounting frame 24 includes the fixed spacer portion 72 and hinge pins 74 of hinge assemblies 70*b* as a unitary structure (i.e., each of the components are permanently secured/welded to each other or otherwise included within the same component). In other words, second mounting frame is provided with each fixed spacer portion 72 already secured to the second mounting frame 24 as described above and then each hinge pin secured to its fixed spacer portion 72 (or the hinge pin 74 itself formed with a fixed spacer portion 72 that is secured to the mounting frame 24). Hinge assembly 70*a* is similar to hinge assembly 70*b* except that its hinge pin 74 is provided as a loose component to the fixed spacer portion 72. During installation, and after determining the appropriate removable spacer portions 76*a*-76*c* for hinge assemblies 70*a* and/or 70*b*, the access panel 50 is first lowered onto hinge assembly 70*b*. Access panel 50 is then properly positioned with respect to hinge assembly 70*a* such that pin 74 may be inserted and retained with respect to respect to the hinge assembly 70*a*.

It should be understood that removable spacer portions 76*a*-76*c* could be provided to the technician in any number of different options for altering the vertical positioning of the access panels with respect to the mounting frames 22, 24. In this regard, removable spacer portions 76*a*-76*c* could each include spacers of varying lengths such that the vertical positioning is determined by selecting a spacer portion 76*a*-76*c* with the desired length. Alternatively, or in combination with provided spacers of varying lengths, spacers 76*a*-76*c* could be provided with the same length such that the vertical positioning is determined at least in part by the number of spacer portions 76*a*-76*c* disposed between the fixed spacer portion 72 and the frame portion 51 of the access panel 50.

Figures 5, 6:
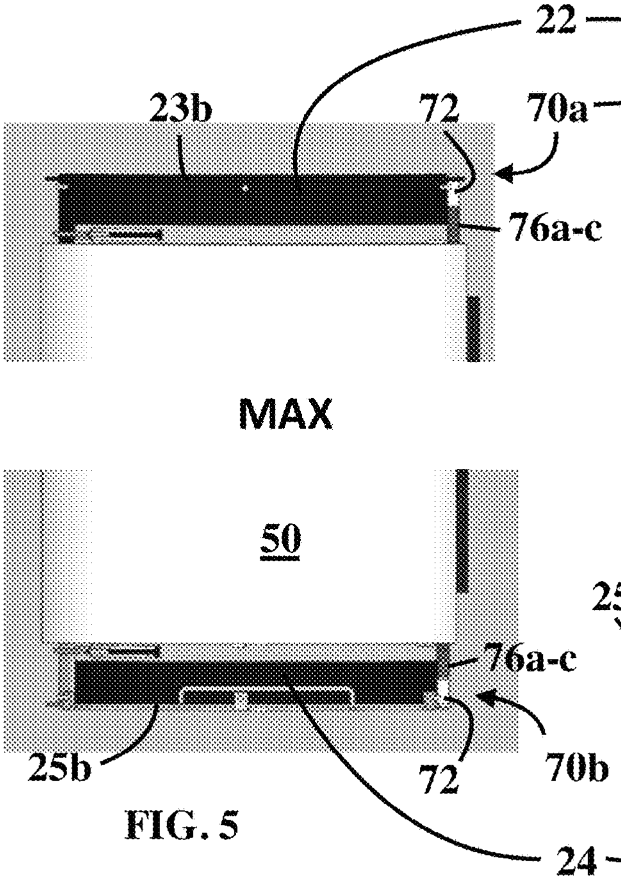
FIG. 5 depicts an access panel with both its first and second mounting frames in an extended position with respect to the access panel using hinge assemblies with removable spacer portions.
FIG. 6 depicts the access panel of FIG. 5 with the removable spacer portions of the hinge assemblies removed such that the first and second mounting frames are in a non-extended position with respect to the access panel.

With reference to FIGS. 5-6, it should also be understood that the vertical positioning of the access panels may be modified by either of the hinge assembly 70*b* connected to mounting frame 24 (i.e., hinge assembly adjacent a bottom end of access panel) or the opposite hinge assembly 70*a* connected to mounting frame 22 (i.e., hinge assembly adjacent the top end of access panel). In this regard, FIG. 5 depicts both hinge assembly 70*a* and 70*b* including removable spacer portions 76*a*-76*c* for extending the distance between the access panel 50 and flange portions 23*b* and 25*b* of mounting frames 22, 24. On the other hand, FIG. 6 depicts the same hinge assemblies 70*a*, 70*b* having the removable spacer portions 76*a*-76*c* removed to shorten the distance between the access panel 50 and the flange portions 23*b*, 25*b* of mounting frames 22, 24. In preferred embodiments, using removable spacer portions 76*a*-76*c* for both hinge assemblies 70*a*, 70*b* provides a total flexibility of about six inches per panel 50 (i.e., three inches for the upper end of access panel+three inches for the lower end of the access panel). In other embodiments, one of hinge assemblies 70*a*, 70*b* may include a fixed positioning with respect to its mounting frame 22, 24 while only the opposite hinge assembly is configured to allow for the vertical positioning to be altered.

According to another aspect of the disclosure, cover panels 52 of varying heights may be provided. The varying heights of the cover panels would be based on the potential changes in the vertical positioning of the access panels 50 with respect to the mounting frames 22, 24. For example, and as noted above, FIGS. 5-6 depict a radome system according to the present disclosure in which each panel 50 may be adjusted up to 6 inches. The cover panels 52 of varying heights would then be provided based on the intended potential adjustments within the minimum and maximum range. Alternatively, each cover panel 50 may be field adjusted to match the space needed to cover the gaps between stacked access panels and/or to cover the latch and hinge assemblies.

What is claimed is:

1. A radome system comprising:

an access panel having an upper end and a lower end, the upper end including an upper latch and the lower end including a lower latch; and a frame system including a first mounting frame formed from one or more first mounting frame sections positioned adjacent the upper end of the access panel and a second mounting frame formed from one or more second mounting frame sections positioned adjacent the lower end of the access panel, the upper end of the access panel being hindgedly connected to the first mounting frame and the lower end of the access panel being hingedly connected to the second mounting frame for hingedly connecting the access panel to the frame system, the first mounting frame including an upper latch receiver for removably securing the upper end of the access panel to the first mounting frame when the upper latch engages the upper latch receiver, and the second mounting frame including a lower latch receiver for removably securing the lower end of the access panel to the second mounting frame when the lower latch engages the lower latch receiver, wherein the first mounting frame and the second mounting frame each include a sidewall portion for securing at least one of the first and second mounting frame sections to a support structure of a monopole and a flange portion extending radially from the sidewall portion, the flange portion of the first mounting frame including the upper latch receiver and the flange portion of the second mounting frame including the lower latch receiver, and wherein the upper latch and the lower latch each include a hook for engaging the corresponding latch receiver, the upper latch and the lower latch being operable to be manipulated from a first position in which the hook fully engages the latch receiver to a second position in which the hook is disengaged from the latch receiver.

2. The radome system of claim 1 further comprising an upper cover panel configured to be removably secured to the first mounting frame and a lower cover panel configured to be removably secured to the second mounting frame, the upper cover panel dimensioned and configured for covering the upper latch of the access panel and the upper latch receiver of the first mounting frame when the access panel is a closed position and the upper cover panel is removably secured to the first mounting frame, and the lower cover panel dimensioned and configured for covering the lower latch of the access panel and the lower latch receiver of the second mounting frame when the access panel is in the closed position and the lower cover panel is removably secured to the second mounting frame.

3. The radome system of claim 2 wherein the upper latch and the lower latch are sized and dimensioned such that the upper cover panel and the lower cover panel cannot be secured to the corresponding first and second mounting frames when the upper and lower latch are not in the first position.

4. The radome system of claim 3 wherein the upper latch receiver includes an upper vertical post member extending downward along a length of the sidewall portion of the first mounting frame and spaced apart from the sidewall portion of the first mounting frame and the lower latch receiver includes a lower vertical post member extending upward along a length of the sidewall portion of the second mounting frame and spaced apart from the sidewall portion of the second mounting frame, and wherein the hook of the upper and lower latch is configured to engage the upper and lower vertical post member of the corresponding upper and lower latch receiver at different positions along the vertical post member based on a vertical positioning of the access panel with respect to the first and second mounting frames.

5. The radome system of claim 1 wherein at least one of the first mounting frame and the second mounting frame include a hinge assembly having a hinge pin for rotatably engaging a hinge frame portion of the access panel and one or more removable spacer portions configured to adjust a height in which the hinge pin engages the hinge frame portion such that the vertical positioning of the access panel with respect to the first and second mounting frames is adjustable.

6. The radome system of claim 5 wherein the hinge assembly includes a fixed spacer portion secured to one of the first mounting frame and the second mounting frame and a collar, the hinge pin configured to extend from the fixed spacer portion with the one or more removable spacer portions positioned around the hinge pin between the fixed spacer portion and the collar.

7. The radome system of claim 6 wherein each of the first mounting frame and the second mounting frame include a sidewall portion for securing the first and second mounting frames to a support structure of a monopole and a flange portion extending radially from the sidewall portion, the flange portion of one of the first mounting frame and the second mounting frame including the fixed spacer portion.

8. The radome system of claim 1 further comprising a latch bar secured to the second mounting frame, the latch bar including a distal end for engaging the lower end of the access panel to hold the access panel in an open position.

9. The radome system of claim 1 further comprising a plurality of access panels each having an upper end hingedly connected to the first mounting frame and a lower end hingedly connected to the second mounting frame.

10. A radome system comprising:

an access panel having an upper end and a lower end; and a frame system including a first mounting frame formed from one or more first mounting frame sections positioned adjacent the upper end of the access panel and a second mounting frame formed from one or more second mounting frame sections positioned adjacent the lower end of the access panel, the upper end of the access panel being hindgedly connected to the first mounting frame and the lower end of the access panel being hingedly connected to the second mounting frame;

wherein at least one of the first mounting frame and the second mounting frame include a hinge assembly having a hinge pin for rotatably engaging a hinge frame portion of the access panel and a plurality of removable spacer portions for selectively adjusting a height in which the hinge pin engages the hinge frame portion such that a vertical positioning of the access panel with respect to the frame system is adjustable.

11. The radome system of claim 10 wherein the hinge assembly includes a fixed spacer portion secured to one of the first mounting frame and the second mounting frame and a collar, the hinge pin configured to extend from the fixed spacer portion with the plurality of removable spacer portions configured to be selectively positioned around the hinge pin between the fixed spacer portion and the collar.

12. The radome system of claim 11 wherein each of the first mounting frame and the second mounting frame include a sidewall portion for securing the first and second mounting frames to a support structure of a monopole and a flange portion extending radially from the sidewall portion, the flange portion of one of the first mounting frame and the second mounting frame including the fixed spacer portion.

13. The radome system of claim 12 wherein the hinge pin is secured to the fixed spacer portion.

14. The radome system of claim 12 wherein the fixed spacer portion is configured to receive the hinge pin.

15. The radome system of claim 10 wherein both the first mounting frame and the second mounting frame include the hinge assembly.

16. The radome system of claim 10 where the plurality of removable spacer portions each include a different length.

17. The radome system of claim 10 further comprising a plurality of access panels each having an upper end hingedly connected to the first mounting frame and a lower end hingedly connected to the second mounting frame, and wherein at least one of the first mounting frame and the second mounting frame include a plurality of hinge assemblies corresponding to the plurality of access panels, each of the plurality of access panels including at least one of the hinge assemblies.

18. A radome system comprising:

an access panel having an upper end and a lower end, the upper end including an upper latch having a first hook portion and the lower end including a lower latch having a second hook portion; and a frame system including:

a first mounting frame formed from one or more first mounting frame sections positioned adjacent the upper end of the access panel, the first mounting frame including an upper latch receiver, and a second mounting frame formed from one or more second mounting frame sections positioned adjacent the lower end of the access panel, the second mounting frame including a lower latch receiver, wherein the upper end of the access panel is hindgedly connected to the first mounting frame and the lower end of the access panel is hingedly connected to the second mounting frame for hingedly connecting the access panel to the frame system, and wherein at least one of the first hook portion of the upper latch and the second hook portion of the lower latch is configured to engage the corresponding upper and lower latch receiver of the at different positions based on a vertical positioning of the access panel with respect to the first and second mounting frames.

19. The radome system of claim 18 wherein at least one of the first mounting frame and the second mounting frame include a hinge assembly, the hinge assembly including a hinge pin for rotatably engaging a hinge frame portion of the access panel and a plurality of removable spacer portions for selectively adjusting a height in which the hinge pin engages the hinge frame portion such that the vertical positioning of the access panel with respect to the frame system is adjustable.

20. The radome system of claim 19 where the plurality of removable spacer portions each include a different length.

* * * * *